United States Patent
Christian et al.

(10) Patent No.: US 7,444,590 B2
(45) Date of Patent: Oct. 28, 2008

(54) SYSTEMS AND METHODS FOR DECLARATIVE LOCALIZATION OF WEB SERVICES

(75) Inventors: Brian S. Christian, Sammamish, WA (US); Russell M. Earnes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 10/603,520

(22) Filed: Jun. 25, 2003

(65) Prior Publication Data

US 2004/0267867 A1 Dec. 30, 2004

(51) Int. Cl.
*G06F 17/00* (2006.01)
*G06F 17/20* (2006.01)
*G06F 17/28* (2006.01)

(52) U.S. Cl. .............. 715/264; 715/200; 715/204; 715/234; 715/255; 715/256; 715/265

(58) Field of Classification Search .......... 715/501.1, 715/513, 536, 540, 200, 204, 234, 243, 249, 715/255, 256, 264, 265; 709/200, 217; 707/104.1
See application file for complete search history.

(56) References Cited

U.S. PATENT DOCUMENTS

| | | | | |
|---|---|---|---|---|
| 5,442,782 | A * | 8/1995 | Malatesta et al. ............... 707/4 |
| 6,172,972 | B1 * | 1/2001 | Birdwell et al. ............. 370/349 |
| 6,362,840 | B1 * | 3/2002 | Burg et al. .................. 715/835 |
| 6,370,561 | B1 * | 4/2002 | Allard et al. ................ 709/203 |
| 6,381,567 | B1 * | 4/2002 | Christensen et al. ............ 704/8 |
| 6,623,529 | B1 * | 9/2003 | Lakritz ....................... 715/205 |
| 6,839,742 | B1 * | 1/2005 | Dyer et al. .................. 709/217 |
| 7,007,026 | B2 * | 2/2006 | Wilkinson et al. ............ 707/10 |
| 7,024,365 | B1 * | 4/2006 | Koff et al. ................ 704/270.1 |
| 2001/0044809 | A1 * | 11/2001 | Parasnis et al. ............. 707/513 |
| 2002/0162093 | A1 * | 10/2002 | Zhou et al. .................. 717/130 |
| 2003/0004703 | A1 * | 1/2003 | Prabhakar et al. .............. 704/8 |
| 2003/0005159 | A1 * | 1/2003 | Kumhyr ..................... 709/246 |
| 2003/0084401 | A1 * | 5/2003 | Abel et al. ............... 715/501.1 |
| 2003/0115186 | A1 * | 6/2003 | Wilkinson et al. ............ 707/3 |
| 2003/0135501 | A1 * | 7/2003 | Frerebeau et al. ........... 707/100 |
| 2003/0160810 | A1 * | 8/2003 | Talley et al. ................ 345/703 |
| 2004/0034521 | A1 * | 2/2004 | Kawakura et al. .............. 704/1 |
| 2004/0088155 | A1 * | 5/2004 | Kerr et al. ..................... 704/8 |
| 2004/0167768 | A1 * | 8/2004 | Travieso et al. ................ 704/2 |
| 2004/0205118 | A1 * | 10/2004 | Yu ............................. 709/203 |
| 2005/0102616 | A1 * | 5/2005 | Thurston .................... 715/513 |

OTHER PUBLICATIONS

Jan H. Spyridakis and Waka Fukuoka, The Effect of Inductively Versus Deductively Organized Text on American and Japanese Readers, Jun. 2002, Professional Communication, IEEE Transaction on vol. 45, Issue on Jun. 2, 2002, pp. 99-114.*

(Continued)

*Primary Examiner*—Rachna S. Desai
*Assistant Examiner*—Chau Nguyen
(74) *Attorney, Agent, or Firm*—Lee & Hayes, PLLC (57) ABSTRACT

Systems and methods are described for declarative localization of web services. A "localize" attribute is described that uniquely identifies localized content for the final rendered element. The "localize" attribute is stripped out during the rendering process, so it never reaches the client or agent, making the "localize" attribute HTML-compliant. A separate satellite assembly is maintained for each culture. When a request is received, a culture is identified and the "localize" attribute directs processing to utilize content maintained in the satellite assembly associated with the identified culture. Processing then continues normally.

25 Claims, 4 Drawing Sheets

OTHER PUBLICATIONS

C. Douglas, "Translation, globalization and localization", Sep. 23-25, 1998, IEEE International vol. 2, Professional Communication Conference, 1998. IPCC 98. Proceedings, pp. 145-151.*

J.B. Strother, "Preparing material for the international marketplace: more than technical localization required", Sep. 17-20, 2002, IEEE International, Professional Communication Conference, 2002. IPCC 2002. Proceedings, pp. 51-59.*

* cited by examiner

SYSTEMS AND METHODS FOR DECLARATIVE LOCALIZATION OF WEB SERVICES

TECHNICAL FIELD

The systems and methods described herein relate to providing web services for multiple cultures. More particularly, the systems and methods described herein relate to declarative localization of web services for multiple cultures.

BACKGROUND

The phenomenal growth of the Internet has extended computer-related technology and web-based services to a vast number of countries around the world. To realize the potential of such a market, providers of web-based services must take into account a large number of different languages spoken by computer users in all of these countries. Even in cultures that use similar languages (e.g. U.S. English vs. U.K. English) the differences in the cultures and the language can require different versions of web-based services for each culture.

Providing different versions of the same service can create maintenance nightmares for web service providers. Consider a web site that supports one or more media player applications, including providing artist and album information to users. Maintaining a different version of all such information for each culture reached by the service and keeping projects consistent with each other is virtually impossible.

A previous attempt to solve this problem was to create a piece of shared code that could be included in a given project and called whenever a particular piece of content needed to be localized. While the solution works, it also causes a significant amount of source code calls to be interspersed with standard HTML tags, and other content. The approach is also somewhat error-prone and leads to pages of content that can be difficult to read, debug and maintain.

SUMMARY

Systems and methods are described for declarative localization of web services. A "localize" attribute is described that uniquely identifies localized content for the final rendered element, be it the main text of that element, a localized attribute or any combination thereof. The "localize" attribute is stripped out during the rendering process, so it never reaches the client or agent, thus making the "localize" attribute compliant with HTML standards.

A separate satellite assembly (e.g. a dynamically linked library (DLL)) is maintained for each culture. When a request is received, a culture is identified from headers or from parameters of the request. The "localize" attribute directs processing to utilize content maintained in the satellite assembly associated with the identified culture. Processing then continues normally.

The declarative solution fits transparently into existing HTML specifications, guidelines and practices. The term "declarative" indicates that there are no procedural code calls (functions) in the content to be localized. This creates a much more distinct separation between the presented content and the corresponding logic for a given item of functionality. It is also much easier to read and understand—and, hence, to maintain—these two, distinct parts of a web-based service.

BRIEF DESCRIPTION OF THE DRAWINGS

The same numbers are used throughout the document to reference like components and/or features.

DETAILED DESCRIPTION

The following depictions describe one or more exemplary systems and/or methods for declarative localization for web services. The examples described are but a few examples of various manners in which the subject matter of the appended claims may be implemented. The described examples are not intended to limit the scope of the appended claims in any manner, but are shown to accurately describe the best mode of carrying out the invention delineated by the claims.

The examples relate generally to HyperText Markup Language (HTML) content that is transmitted from a server to a client. Specifically, the examples relate to ASP.NET technology. ASP.NET (Active Server Pages) is a server-side scripting technique promulgated by MICROSOFT CORP® that enables server execution of scripts embedded in web pages. ASP.NET is included in the WINDOWS® family of operating systems.

ASP.NET is related to HTML and an ASP.NET file (a file having an .aspx extension) may contain HTML. In addition to HTML, an ASP.NET file may contain text or XML.

When a client web browser requests an HTML file from a server, an Internet Information Server (IIS) in the server passes the request to an ASP.NET module. An ASP.NET engine then compiles the requested file into a temporary Assembly, which is then executed on the server. The resultant output of this execution is returned to the client web browser, usually as a plain HTML file.

Although the present examples will focus on ASP.NET technology, it is noted that the examples may be implemented with any other form of web services scripting technology without departing from the scope of the claimed systems and methods.

The systems and methods described herein define a custom attribute—"localize"—to be used inside of any HTML or ASP.NET control element to identify localized content that should be applied to the application that includes the control element. (The "localize" attribute conforms to HTML specifications, which state that a user agent is to "safely ignore" any attributes that it does not specifically understand.)

The format of a "localize" attribute value is a simple name-value pair delineated by a colon (:) that is well known in the art (e.g. "name1:value1). Multiple name value pairs may be defined by further separating these pairs with a semi-colon (;) (e.g. "name1:value1;name2:value2"). In all cases, whitespace next to the delineations is ignored.

Within the value format, there is a single reserved name called "Text." This name refers to the normalized set of properties across all forms of HTML elements or ASP.NET controls, in which the text is considered to be the "main" visible text of the element This normalization reduces the potential for error and makes it easier to track what will be localized on all elements. For instance, ASP.NET controls all have the "Text" property, whereas HTML elements may have "InnerText," "value" or "Text" depending on its type. In the localization systems and methods described herein, each of these is simply referred to as "Text."

Any other values in the value format refer to attributes that will either be changed or added to reflect their localized version. This allows localization of attributes in addition to the main text of a given element, e.g. the "src" of an image tag, the "title" of an anchor tag, etc.

An example of the "localize" attribute and its value(s) conforming to a standard HTML anchor tag follows:

<a href=' . . . ' title="A Title"localize="Text:link123;Title:title123">Default link text</a>

The example shown above will be discussed in greater detail, below.

Exemplary Network Environment

Figure 1:
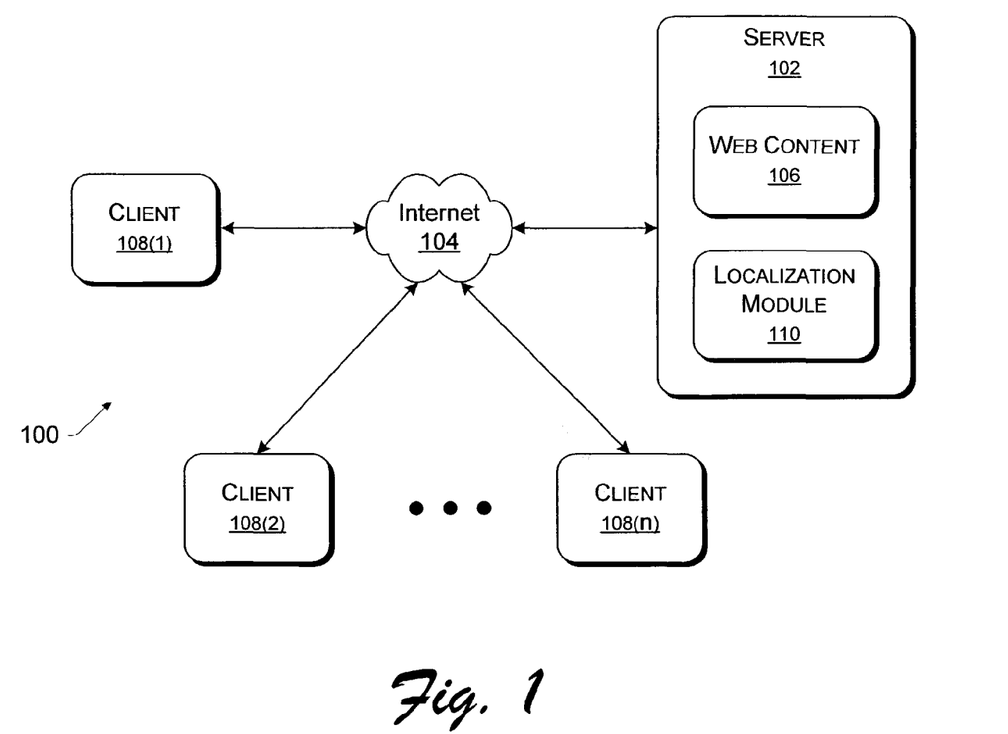
FIG. 1 illustrates an exemplary network environment.

FIG. 1 illustrates an exemplary network environment 100. The exemplary network environment 100 includes a server 102 that communicates over the Internet 104 to provide web content 106 to multiple clients 108(1)-108(n), hereinafter referred to collectively as client(s) 108.

Although the server 102 is shown communicating with the clients 108 over the Internet 104, it is noted that the server 102 may access the clients 108 via some other type of network, such as a local area network (LAN), a wide access network (WAN), or the like. In addition, a server 102 may sometimes communicate directly with a client 108 via a direct connection via a modem, cable modem, etc. (not shown).

The server 102 also includes a localization module 110 that is utilized to localize the web content 106. In the present example, the web content 106 is significantly generalized and may contain virtually any number of content pages or items. Some of such content pages or items may not require the localization modules. But if a content page or item is designed for a first culture, and a client 108 wishes to render the web content 106 for a second culture, the localization module 110 is used to localize—or translate, to some extent—certain portions of the web content 106 to make the web content 106 appropriate for the second culture.

The localization module 110 and its functionality are described in greater detail, below, with respect to following figures.

Exemplary Localization Module

Figure 2:
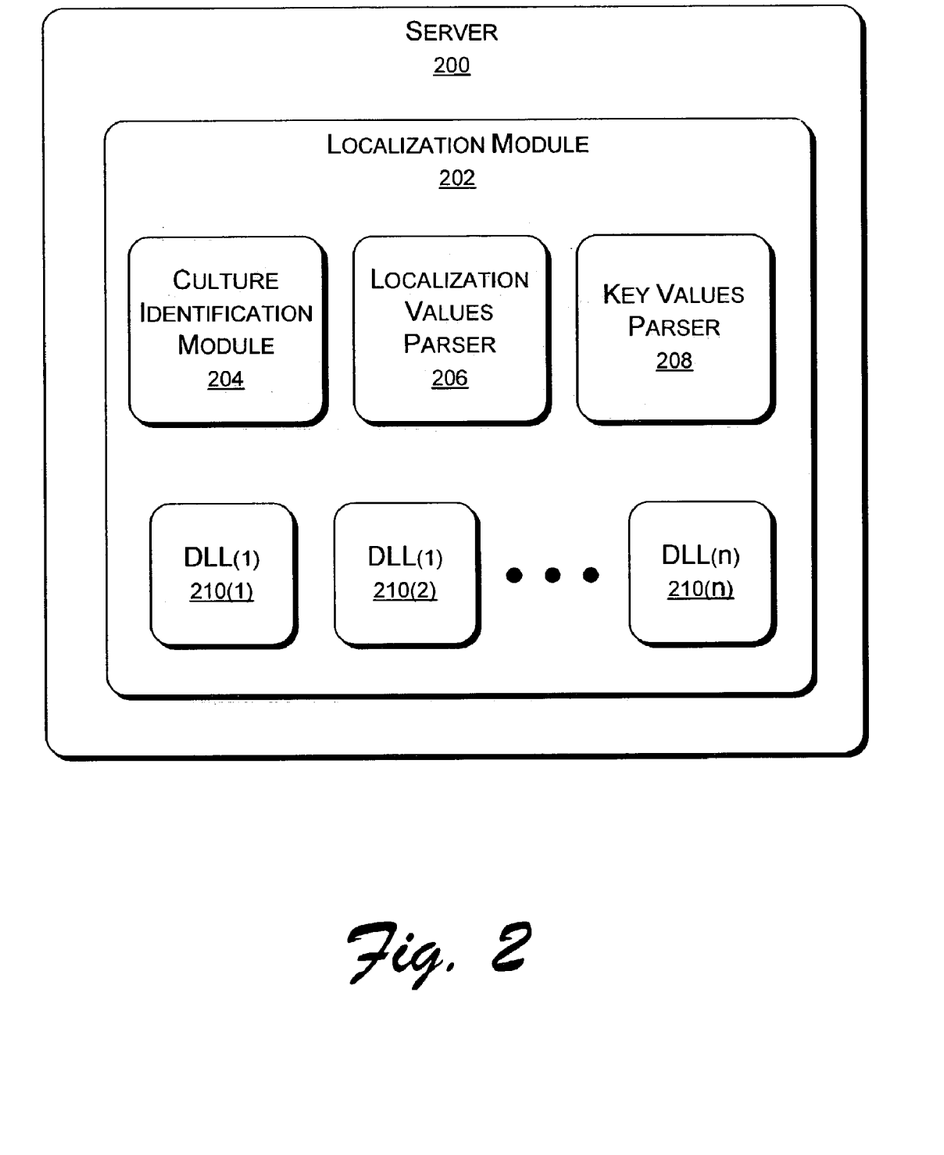
FIG. 2 illustrates exemplary server and client devices.

FIG. 2 is a simplified block diagram depicting a server 200 that includes an exemplary localization module 202 similar to the localization module 108 shown in FIG. 1. The localization module 202 includes a culture identification module 204, a localization values parser 206 and a key values parser 208. In addition, the localization module 202 includes multiple satellite assemblies or dynamically linked libraries (DLLs) 210(1), 210(2) through 210(n)—(hereinafter designated as DLL(s) 210).

The culture identification module 204 is configured to identify a culture associated with a page request. The identification may be accomplished by parsing headers or by recognizing one or more parameters that identify the appropriate culture.

The localization values parser 206 is configured to identify a "localize" attribute, match "Text" keyword values to element types, add new or existing attributes and to strip the "localize" attribute and associated values from the original element before passing the element to a user agent, such as a client.

The key values parser 208 is utilized by the localization values parser 206 to identify key values in an element and redirect or substitute localized values for the key values. In the previously stated example, the values in the string (localize="Text:link123;Title:title123), are parsed into separate values that contain identifiers used for later lookup functions. Here, the text of the element in question is replaced by the value of the localized content with the identifier of "link123" (i.e. "link123" is the identifier of the localized content contained within the satellite assembly for the current culture).

The DLLs 210 each correspond to a culture and contain localized values that are to be substituted for original values in an HTML page. There is one DLL for each supported culture. When an additional culture is desired to be supported, a new DLL is developed for that culture. No amendment to a web page is necessary.

The function of the elements shown and described in FIG. 2 will be discussed in greater detail with respect to the exemplary methodological implementation shown in FIG. 3, below.

Exemplary Methodological Implementation

Figure 3:
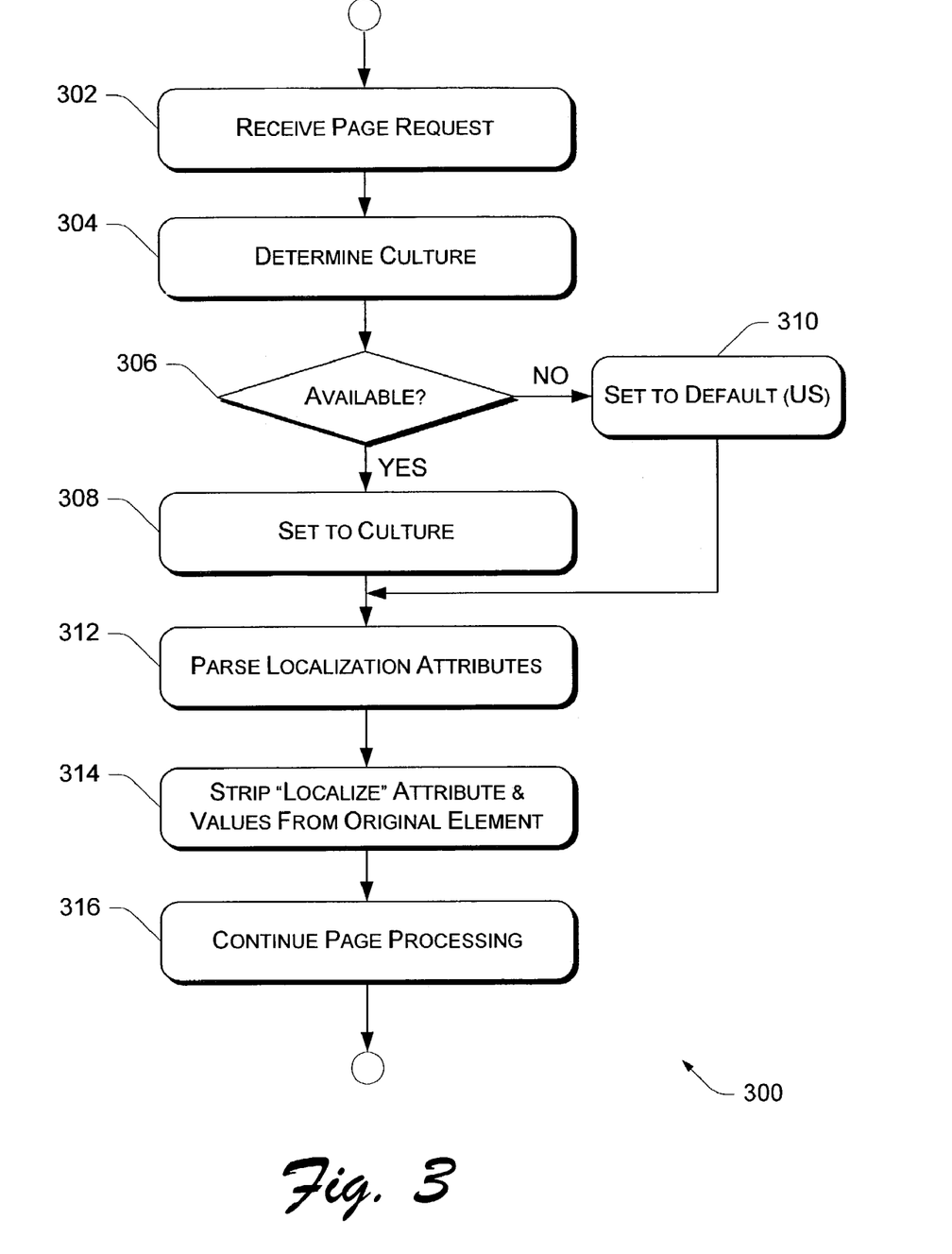
FIG. 3 is a flowchart illustrating a methodological implementation of declarative localization of web-based services.

FIG. 3 is a flowchart 300 illustrating a methodological implementation of declarative localization of web-based services. In the following discussion, continuing reference will be made to the elements and reference numerals shown in FIG. 2.

At block 302, the server 200 receives a page request from a client 110. The page request is a standard request for web content to be transmitted from the server 200 to the client 110. At block 304, the culture identification module 204 attempts to identify a culture associated with the request from the page request. This may be done by identifying headers associated with a particular culture, identifying culture identifiers within headers, by identifying culture parameters associated with the page request, or by any other method known in the art. If a culture cannot be identified, then a default culture is used. In at least one implementation, the default culture is US-English.

If the identified culture is available, i.e., if there is a satellite assembly stored in the localization module associated with the identified culture, ("Yes" branch, block 306) then the localization module 202 references the DLL 210 associated with that culture at block 308. In at least one implementation, the localization module 202 may access a remote device to locate an appropriate DLL 210 if the DLL 210 is not already stored at the server 200.

If there is no DLL 210 associated with the identified culture ("No" branch, block 306) then the localization module 202 sets to the default culture at block 310. Again, in one implementation, the default culture is US-English.

At block 312, the localization values parser 206 parses the localization attributes to determine attributes that are to be localized. During this process, the key values parser 208 parses key values located in the localization attributes and associates elements with those key values.

At block 314, the localization module strips the "localize" attribute from the original element before continuing to process the page at block 316. The page processing subsequent to the localization includes running any scripts or page-behind code associated with the web page. By taking care of the localization first, the appropriate page attributes are known before the page is processed and sent to the client.

The following discussion is a continuation of the example referenced previously, where a page request contains the following attributes and values in a standard HTML anchor tag:

<a href=' . . . 'title="A Title"localize="Text:link123;Title:title123">Default link text</a>

If the requesting agent is making the request in US English, no action need be taken except to remove the "localize" attribute and its value(s) from the element upon final rendering. However, if the request is made in any other culture the system will attempt to load a satellite assembly associated with that particular culture, then replace the text "Default link text" with the text found at the id of "link123" in that assembly. Furthermore, the attribute value "A Title" will be replaced by any localized text found at the id of "title 123" in the same satellite assembly.

It is noted that the transformation takes place before the page-specific code runs for a given page. This ensures that runtime calculations of string length are 11 accurate for any given culture as these calculations will occur on already localized content.

Particularly relative to WINDOWS®, to participate in this system a page must directly or indirectly inherit from the "Page" Class. Also, the ASP.NET guidelines for satellite assembly naming and locations must be followed for the system to locate the localized content. The described functionality is implemented in the Page Class. Upon start-up, this base class will scan the entire control tree of the derived class looking for, inter alia, the "localize" attribute on any elements that are also marked with the "runat" attribute value equal to "server." For example, <span id="myspan'runat='server' localize='Text: 123'>Default text here</span>.

Once an element is found to contain these attributes, the system ascertains the culture in which the request is being made. The system will then attempt to load the corresponding localized string(s) from the satellite assembly created in that culture and replace the existing string values on that element. If this should fail for any reason, the system will revert to a default culture (US-English) and the error may be handled by the page creator.

The value of the "localize" attribute is a collection of names of the string resources to load from the appropriate satellite assembly. For instance, using the example above, a satellite assembly for each supported culture would need to include the string property named "123" with values that match that string for the particular culture.

The directory structure for each project should follow the standard .net guidelines for localization. The localized content exists in a satellite assembly located in a specifically named subdirectory of the project's bin directory. All of the assemblies are similarly named, and are differentiated by their parent folder. For instance, the default US English Satellite Assembly would exist in the \bin\en-US directory and be named <projectname>.resources.dll. One example of such a name is RadioTuner.resources.dll.

As previously noted, while the localization framework will normally derive the current culture from a Request object on each page view, a page developer can override this behavior by including a different culture in the query string. In at least one implementation, the parameter is "culture" as in the following example:

http:/bluebook/local/default.aspx?culture=es which sets the culture for traditional Spanish, and http://bluebook/local/default.aspx?culture=es-cl which sets the culture for the request to Chilean Spanish.

In one implementation, in cases where a basic version of a culture is available but a more specific version of a culture is not, the default culture is set to the basic version. In the example presented above, if Chilean Spanish is not available, but traditional Spanish is, the system will automatically default to traditional Spanish.

Using the techniques described above, web content pages can be supported for a number of different cultures with little confusion. Each web page can remain intact while supporting the different cultures, since the techniques are declarative and require no external procedural calls within the page. As a result, maintaining cultural-specific web pages may be accomplished with a minimal amount of resource overhead.

Exemplary Operating Environment

Figure 4:
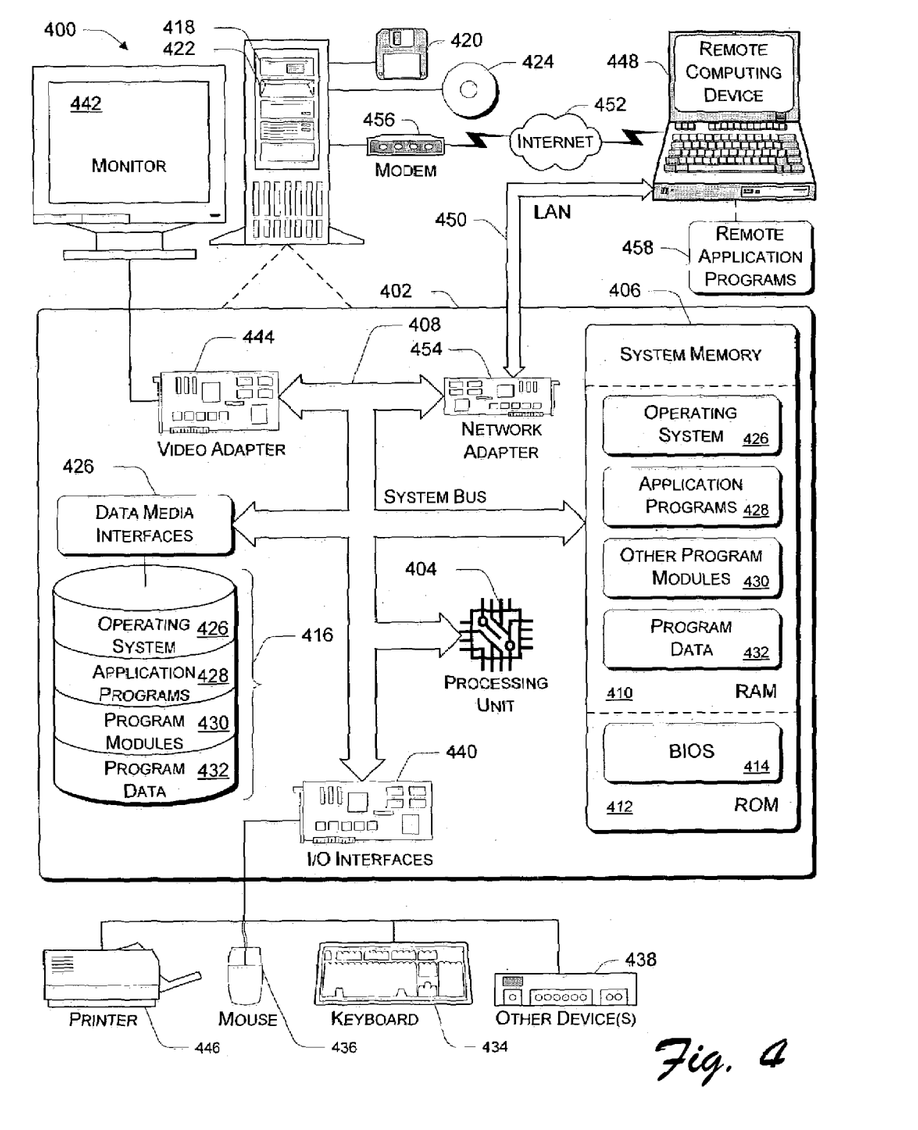
FIG. 4 illustrates a general computer environment, which can be used to implement the techniques described herein.

FIG. 4 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client 110 or server 102 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish; serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of providing localization of a web service, comprising:

receiving by a server an HTML page request for a web page via a network from a client web browser in a requester of the web service;

identifying by the server a culture associated with the received HTML page request by the server examining parameters embedded in the HTML page request to recognize culture identifiers;

identifying by the server a localization attribute and one or more values associated with the localization attribute in a requested page associated with the HTML page request;

determining by the server whether one of a plurality of satellite assemblies is associated with the identified localization attribute;

referencing by the server the satellite assembly associated with the identified localization attribute to locate content in the satellite assembly associated with each of the one or more values associated with the localization attribute, the satellite assembly being configured to provide the content prior to execution by the server of a script embedded in the requested page;

replacing by the server the identified one or more values associated with the localization attribute in the requested page with the content associated with the each of the one or more values located in the referenced satellite assembly;

running by the server scripts embedded in the requested web page with the replaced identified values associated with the localization attribute in the requested page to provide a culture-dependent response; and transmitting by the server via the network the requested web page containing the culture-dependent response to the client web browser in the requester of the web service.

2. The method as recited in claim 1, wherein the localization attribute further comprises the value "localize".

3. The method as recited in claim 1, wherein the identifying a culture associated with the received HTML page request further comprises identifying a culture parameter included with a page request, the culture parameter identifying a culture.

4. The method as recited in claim 1, wherein the identifying a culture associated with the received HTML page request further comprises identifying values unique to a culture in one or more headers associated with the page request.

5. The method as recited in claim 1, wherein the satellite assembly further comprises a dynamically linked library (DLL).

6. The method as recited in claim 1, wherein the content associated with the each of the one or more values located in the referenced satellite assembly comprises content specific to the identified culture.

7. The method as recited in claim 1, wherein the determining whether one of a plurality of satellite assemblies is associated with the identified culture includes determining whether a satellite assembly associated with the identified culture is unavailable, and wherein the method further comprises referencing the satellite assembly associated with a default culture in the event that the satellite assembly associated with the identified culture is unavailable.

8. The method as recited in claim 7, wherein the default culture further comprises a culture that is predefined to be the default culture.

9. The method as recited in claim 7, wherein the default culture further comprises a culture that is a base culture of the identified culture, and wherein the identified culture being a culture that is derived from the base culture.

10. A computing-based system for providing localization of a web service, comprising:

a server comprising a memory, the server configured to receive a page request for a web page via a network from an agent;

a culture identification module in the server configured to identify a culture associated with the received page request by the server analyzing content embedded in the page request to recognize culture parameters;

a localization values parsing module in the server configured to identify a localization attribute and values in a requested page associated with the received page request;

a key values parser in the server configured to locate localized content associated with the localization attributes and localization values and to designate content referenced by the localization attributes and localization values in the requested page;

a satellite assembly in the server, selected using the culture identified by analyzing the received page request, that includes the localized content located by the key values parser, the satellite assembly providing the localized content to replace content on the requested page prior to a server executing a script containing the localized content embedded in the requested page;

wherein the localized content is associated with the identified culture and is utilized by the server when the requested page is served to the agent making the page request; and a transmission module in the server configured to transmit to the agent via the network the requested web page containing the localized content.

11. The computing-based system as recited in claim 10, wherein the satellite assembly associated with the identified culture is further configured to utilize one or more Active Server Pages (ASP.NET) guidelines to locate the localized content.

12. The computing-based system as recited in claim 10, wherein the culture identification module is further configured to identify a culture associated with a page request by identifying a culture identified in a culture parameter contained in the page request.

13. The computing-based system as recited in claim 10, wherein the culture identification module is further configured to identify a culture associated with a page request by identifying values unique to a culture that are contained in one or more headers included in the page request.

14. The computing-based system as recited in claim 10, wherein the localization attribute further comprises the term "localize".

15. The computing-based system as recited in claim 10, wherein the culture identification module is further configured to determine a default culture in the event that content supporting the identified culture cannot be accessed; and the localized content utilized is associated with the default culture.

16. The computing-based system as recited in claim 15, wherein the default culture is a statically defined culture.

17. The computing-based system as recited in claim 15, wherein the default culture is determined to be a base culture of a specific culture that is derived from the base culture when the identified culture is the specific culture.

18. One or more computer-readable media containing computer-executable instructions that, when executed on a computer, perform steps comprising:

receiving by a server via a network an HTTP page request from a client for web content for a preferred culture;

identifying by the server the preferred culture by examining content embedded in the received HTTP page request;

determining by the server if localized web content corresponding to the preferred culture is available;

localizing by the server the web content for the preferred culture if localized web content is available for the preferred culture;

localizing with the server the web content for a default culture if localized web content is not available for the preferred culture, wherein at least one of localizing the web content for the preferred culture and localizing the web content for a default culture includes referencing one of a plurality of satellite assemblies, selected using the identified preferred culture from the page request, to provide a localized content associated with at least one of the preferred culture and the default culture, the referenced satellite assembly being configured to replace the localized web content with non-localized web content on the requested page prior to the computer executing a script, said script being embedded in the requested page with the provided localized web content so that when the script is executed with provided localized web content, attributes of the requested page are known before being transmitted to the client;

executing by the server the script embedded within the requested page with the provided localized web content; and delivering by the server the requested page with the executed script to the client via the network.

19. The one or more computer-readable media recited in claim 18, further comprising determining the default culture to be a predefined default culture.

20. The one or more computer-readable media recited in claim 18, further comprising determining the default culture to be a base culture from which the preferred culture is derived.

21. The one or more computer-readable media recited in claim 18, wherein the determining if localized web content corresponding to the preferred culture is available further comprises determining if a satellite assembly associated with the preferred culture is accessible.

22. The one or more computer-readable media recited in claim 18, wherein the localizing the web content further comprises:

identifying a localization attribute included in the page request;

identifying key values and key attributes associated with the localization attribute; and redirecting key values and key attributes to reference the localized web content.

23. The one or more computer-readable media recited in claim 22, wherein the localization attribute further comprises the term "localize".

24. The one or more computer-readable media recited in claim 18, wherein the examining content embedded in the HTTP page request comprises identifying headers embedded in the HTTP page request associated with a particular culture, identifying culture identifiers within the headers, or examining the page request to identify culture parameters associated with the page request.

25. The one or more computer-readable media recited in claim 18, wherein the identifying a requested culture from the page request further comprises recognizing one or more culture-identifying values from one or more headers associated with the page request.

* * * * *